(12) United States Patent
Masuda (10) Patent No.: US 11,257,644 B2
(45) Date of Patent: Feb. 22, 2022

(54) SWITCH SYSTEM

(71) Applicant: SUBARU CORPORATION, Tokyo (JP)

(72) Inventor: Yo Masuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 15 days.

(21) Appl. No.: 16/709,639

(22) Filed: Dec. 10, 2019

(65) Prior Publication Data

US 2020/0258706 A1    Aug. 13, 2020

(30) Foreign Application Priority Data

Feb. 8, 2019    (JP) .............................. JP2019-021787

(51) Int. Cl.
*H01H 47/02*    (2006.01)
*H01H 47/16*    (2006.01)
(Continued)

(52) U.S. Cl.
CPC ............. *H01H 47/16* (2013.01); *B60L 53/62* (2019.02); *H01H 43/026* (2013.01); *H02J 7/0031* (2013.01); *H02J 7/00309* (2020.01); *H02J 7/007192* (2020.01); *H01H 2047/025* (2013.01); *H01H 2231/026* (2013.01); *H01H 2239/06* (2013.01)

(58) Field of Classification Search
CPC ............. H01M 10/425; H01M 10/482; H01M 10/486; H01M 2010/4271; H01M 50/20; H01M 2200/10; H02J 7/00309; H02J 7/007192; H02J 7/0031; H01H 43/026; H01H 47/002; H01H 47/16; H01H 47/02; H01H 2047/025; H01H 2231/026; B60L 3/00; B60L 3/04; B60L 53/62; B60L 2270/20; H02H 7/18
See application file for complete search history.

(56) References Cited

U.S. PATENT DOCUMENTS

2009/0212627 A1*  8/2009  Sakata ................... B60L 3/0046
                                                       307/10.7
2013/0116875 A1*  5/2013  Oh ....................... B60L 15/2045
                                                       701/22
(Continued)

FOREIGN PATENT DOCUMENTS

JP    2009-201266 A    9/2009

*Primary Examiner* — Bryan R Perez
(74) *Attorney, Agent, or Firm* — McGinn IP Law Group, PLLC (57) ABSTRACT

A switch system includes a system main relay, a temperature measuring unit, and a controller. The system main relay is configured to electrically connect a battery and an onboard device to each other by turning on a contact point, and to electrically disconnect the battery and the onboard device by turning off the contact point. The temperature measuring unit is configured to measure temperature of the contact point of the system main relay. The controller is configured to cause the system main relay to repeatedly turn on and off the contact point at a predetermined timing, (i) when the temperature of the contact point of the system main relay is a predetermined temperature or more or (ii) when an amount of rise in the temperature of the contact point is a predetermined amount or more.

14 Claims, 6 Drawing Sheets

(51) Int. Cl.
*H02J 7/00* (2006.01)
*B60L 53/62* (2019.01)
*H01H 43/02* (2006.01)

(56) References Cited

U.S. PATENT DOCUMENTS

2017/0279288 A1* 9/2017 Kimura ................. H02J 7/0072
2019/0334342 A1* 10/2019 Nam ..................... H02H 5/041

* cited by examiner

SWITCH SYSTEM

CROSS-REFERENCE TO RELATED APPLICATIONS

The present application claims priority from Japanese Patent Application No. 2019-021787 filed on Feb. 8, 2019, the entire contents of which are hereby incorporated by reference.

BACKGROUND

The disclosure relates to a switch system that switches electrical connections between a battery and an onboard device.

Vehicles include an onboard device, such as an inverter, and a high-voltage battery that are coupled to each other via a contactor or a relay. One example is disclosed in Japanese Unexamined Patent Application Publication No. 2009-201266.

SUMMARY

An aspect of the disclosure provides a switch system includes a system main relay, a temperature measuring unit, and a controller. The system main relay is configured to electrically connect a battery and an onboard device to each other by turning on a contact point, and to electrically disconnect the battery and the onboard device by turning off the contact point. The temperature measuring unit configured to measure temperature of the contact point of the system main relay. The controller is configured to cause the system main relay to repeatedly turn on and off the contact point at a predetermined timing, (i) when the temperature of the contact point of the system main relay is a predetermined temperature or more or (ii) when an amount of rise in the temperature of the contact point is a predetermined amount or more.

An aspect of the disclosure provides a switch system includes a system main relay, a temperature measuring unit, and circuitry. The system main relay is configured to electrically connect a battery and an onboard device to each other by turning on a contact point, and to electrically disconnect the battery and the onboard device by turning off the contact point. The temperature measuring unit configured to measure temperature of the contact point of the system main relay. The circuitry is configured to cause the system main relay to repeatedly turn on and off the contact point at a predetermined timing, (i) when the temperature of the contact point of the system main relay is a predetermined temperature or more or (ii) when an amount of rise in the temperature of the contact point is a predetermined amount or more.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

A contact point of a relay has a resistance value due to contact resistance between contact points. The resistance value of the contact point may be increased due to a cause such as arc discharging that is generated between the contact points or aging deterioration of the relay. When the resistance value of the contact point is increased, the contact point generates heat by current that flows between the contact points and increases the temperature of the contact point. There is room for improvement in that the contact point having an excessively high temperature may cause welding between the contact points.

It is desirable to provide a switch system that allows decreasing of an increased resistance value of a contact point.

First Embodiment

Figure 1:
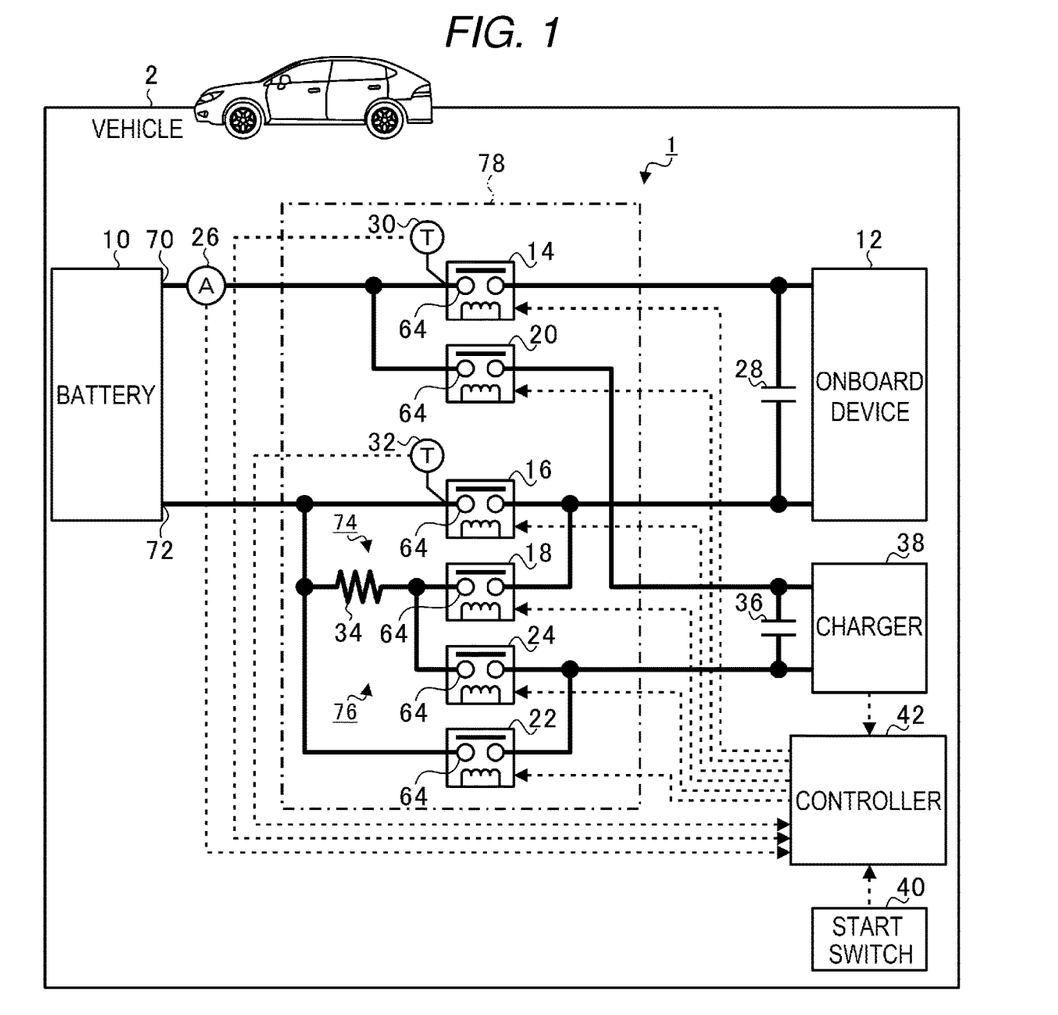
FIG. 1 is a schematic diagram illustrating the configuration of a switch system according to a first embodiment.

FIG. 1 is a schematic diagram illustrating the configuration of a switch system 1 according to a first embodiment. FIG. 1 illustrates electrical connection with solid lines and flow directions of control signals with dashed-line arrows. The switch system 1 is to be mounted on a vehicle 2. The vehicle 2 is, for example, an electric vehicle including a motor (not illustrated) as a drive source. Alternatively, the vehicle 2 may be a hybrid electric vehicle including an engine along with a motor. The configuration and processing related to the first embodiment will be described in detail below, but the description of configuration and processing unrelated to the first embodiment will be omitted.

The switch system 1 includes a battery 10, an onboard device 12, a first system main relay 14, a second system main relay 16, a pre-charge relay 18, a first charging main relay 20, a second charging main relay 22, a pre-charge relay 24, a current measuring unit 26, a capacitor 28, a first temperature measuring unit 30, a second temperature measuring unit 32, a resistor 34, a capacitor 36, a charger 38, a start switch 40, and a controller 42.

The first system main relay 14 and the second system main relay 16 may be collectively referred to as "system main relays" hereinafter. Also, the first temperature measuring unit 30 and the second temperature measuring unit 32 may be collectively referred to as "temperature measuring units".

The battery 10 is, for example, a secondary battery, such as a lithium ion battery. The battery 10 charges or stores electric power that is supplied from the charger 38, which will be described later. The battery 10 supplies electric power to the motor, for example, in accelerating the vehicle 2. The battery 10 has a relatively high voltage, for example, a voltage of 200 V, in order to supply electric power to the motor. The motor may function as a generator, for example, in decelerating the vehicle 2, and may generate electric power and supply the generated electric power to the battery 10.

The onboard device 12 is coupled to the battery 10. The onboard device 12 transmits and receives electric power to and from the battery 10. The onboard device 12 is, for example, a driving inverter that converts DC power from the battery 10 into AC power with a desired frequency to supply the AC power to the motor. It is noted that the onboard device 12 is not limited to the driving inverter. For example, the onboard device 12 may be an air compressor that generates compression medium for sending cold air or warm air to the vehicle cabin.

The first system main relay 14, the second system main relay 16, the pre-charge relay 18, the first charging main relay 20, the second charging main relay 22, and the pre-charge relay 24 have structures similar to each other. Thus, the structure of the first system main relay 14 will be described below, and descriptions of the other relays will be omitted.

Figure 2:
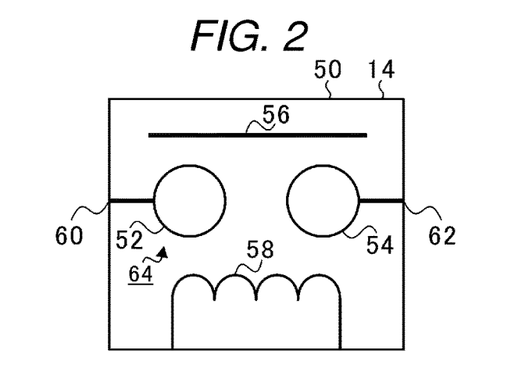
FIG. 2 is a schematic diagram illustrating the structure of a first system main relay.

FIG. 2 is a schematic diagram illustrating the structure of the first system main relay 14. The first system main relay 14 includes a casing 50, a first stationary contact point 52, a second stationary contact point 54, a movable contact point 56, an electromagnetic coil 58, a first terminal 60, and a second terminal 62. The first stationary contact point 52, the second stationary contact point 54, and the movable contact point 56 may be collectively referred to as "contact points 64".

The casing 50 is formed into a hollow box shape. The first stationary contact point 52, the second stationary contact point 54, the movable contact point 56, and the electromagnetic coil 58 are housed in the casing 50. The first stationary contact point 52, the second stationary contact point 54, and the movable contact point 56 are respectively made of metals. The first stationary contact point 52 and the second stationary contact point 54 are fixed to the casing 50 in a state of being separated from each other. The first stationary contact point 52 and the second stationary contact point 54 have a spherical shape, as illustrated in FIG. 2. However, the shape is not limited to the spherical shape and may be a planar shape, for example.

The first terminal 60 and the second terminal 62 are exposed to the outside of the casing 50. The first terminal 60 is coupled to the first stationary contact point 52. The second terminal 62 is coupled to the second stationary contact point 54.

The movable contact point 56 is formed into a planar shape, for example. The movable contact point 56 extends over between the first stationary contact point 52 and the second stationary contact point 54. The movable contact point 56 faces the first stationary contact point 52 and the second stationary contact point 54. The movable contact point 56 is movable in a direction in which the movable contact point 56 faces the first stationary contact point 52 and the second stationary contact point 54.

When current flows through the electromagnetic coil 58 in response to application of voltage to the electromagnetic coil 58, the electromagnetic coil 58 generates a magnetic field in the surrounding space, thereby functioning as an electromagnet. In a state where current does not flow through the electromagnetic coil 58, the movable contact point 56 is separated from the first stationary contact point 52 and the second stationary contact point 54. In this state, the first stationary contact point 52 and the movable contact point 56 are electrically disconnected, and the second stationary contact point 54 and the movable contact point 56 are electrically disconnected. That is, the system main relay 14 is in a turn-off state. That is, the first stationary contact point 52 and the second stationary contact point 54 are electrically disconnected.

The electromagnetic coil 58 attracts the movable contact point 56 when current of a predetermined value or more flows through the electromagnetic coil 58. The movable contact point 56 is then moved toward and brought into contact with the first stationary contact point 52 and the second stationary contact point 54. As a result, the first stationary contact point 52 and the movable contact point 56 are electrically connected, and the second stationary contact point 54 and the movable contact point 56 are electrically connected. That is, the system main relay 14 is in a turn-on state. The first stationary contact point 52 and the second stationary contact point 54 are electrically connected.

Thus, the first system main relay 14 is a normal open relay switch that electromagnetically turns on and off, that is, electromagnetically opens and closes the contact points 64. In one specific example, the first system main relay 14 is a contactor. The other relays such as the second system main relay 16 function in a manner similar to the first system main relay 14.

Returning to FIG. 1, one end, for example, the first terminal 60, of the first system main relay 14 is coupled to a first electrode 70 of the battery 10 via the current measuring unit 26. The first electrode 70 is, for example, a positive electrode. The current measuring unit 26 measures input and output currents to and from the battery 10. The other end, for example, the second terminal 62, of the first system main relay 14 is coupled to the onboard device 12.

One end, for example, a first terminal 60, of the second system main relay 16 is coupled to a second electrode 72 of the battery 10. The second electrode 72 is, for example, a negative electrode. The other end, for example, a second terminal 62, of the second system main relay 16 is coupled to the onboard device 12.

That is, the system main relay electrically connects the battery 10 and the onboard device 12 by turning on or closing the contact points 64. The system main relay electrically disconnects the battery 10 and the onboard device 12 from each other by turning off or opening the contact points 64.

The battery 10 has the first electrode 70 as a positive electrode and has the second electrode 72 as the negative electrode. However, the structure is not limited thereto. Alternatively, the first electrode 70 may be a negative electrode, whereas the second electrode 72 may be a positive electrode.

One electrode of the capacitor 28 is connected with a line that connects the first system main relay 14 and the onboard device 12 with each other. The other electrode of the capacitor 28 is connected with a line that connects the second system main relay 16 and the onboard device 12 with each other. In other words, the capacitor 28 is connected in parallel with the onboard device 12. The capacitor 28 smoothes voltage at an end, on the battery 10 side, of the onboard device 12.

The first temperature measuring unit 30 is provided to, for example, either one of the first terminal 60 and the second terminal 62 of the first system main relay 14. The first temperature measuring unit 30 measures temperature of the contact point 64 via either one of the first terminal 60 and the second terminal 62. The contact point 64 switches electrical connections of the first system main relay 14.

Instead of providing the first temperature measuring unit 30 to either one of the first terminal 60 and the second terminal 62, the first temperature measuring unit 30 may be directly provided to either one of the first stationary contact point 52 and the second stationary contact point 54 of the first system main relay 14. In short, the first temperature measuring unit 30 may simply measure the temperature of the contact point 64 of the first system main relay 14. Alternatively, the first temperature measuring unit 30 may measure temperature in the vicinity of the contact point 64 of the first system main relay 14, instead of measuring the temperature of the contact point 64 itself of the first system main relay 14.

The second temperature measuring unit 32 is provided to, for example, either one of the first terminal 60 and the second terminal 62 of the second system main relay 16. The second temperature measuring unit 32 measures the temperature of the contact point 64 via either one of the first terminal 60 and the second terminal 62. The contact point 64 switches electrical connections of the second system main relay 16.

Instead of providing the second temperature measuring unit 32 to either one of the first terminal 60 and the second terminal 62, the second temperature measuring unit 32 may be directly provided to either one of the first stationary contact point 52 and the second stationary contact point 54 of the second system main relay 16. In short, the second temperature measuring unit 32 may simply measure the temperature of the contact point 64 of the second system main relay 16. Alternatively, the second temperature measuring unit 32 may measure temperature in the vicinity of the contact point 64 of the second system main relay 16, instead of measuring the temperature of the contact point 64 itself of the second system main relay 16.

The switch system 1 is provided with both of the first temperature measuring unit 30 and the second temperature measuring unit 32. However, the system switch 1 is not limited to the structure in which both of the first temperature measuring unit 30 and the second temperature measuring unit 32 are provided. The switch system 1 may be simply provided with at least one of the first temperature measuring unit 30 or the second temperature measuring unit 32.

One end of the resistor 34 is coupled to an end, on the battery 10 side, of the second system main relay 16. The other end of the resistor 34 is coupled to one end of the pre-charge relay 18. The other end of the pre-charge relay 18 is coupled to an end, on the onboard device 12 side, of the second system main relay 16. That is, the resistor 34 and the pre-charge relay 18 are serially connected and form a serial unit 74. The serial unit 74 is connected in parallel to the second system main relay 16.

One end of the first charging main relay 20 is coupled to an end, on the battery 10 side, of the first system main relay 14. In other words, the one end of the first charging main relay 20 is coupled to the first electrode 70 of the battery 10 via the current measuring unit 26. The other end of the first charging main relay 20 is coupled to the charger 38.

One end of the second charging main relay 22 is coupled to an end, on the battery 10 side, of the second system main relay 16. In other words, the one end of the second charging main relay 22 is coupled to the second electrode 72 of the battery 10. The other end of the second charging main relay 22 is coupled to the charger 38.

One electrode of the capacitor 36 is connected with a line that connects the first charging main relay 20 and the charger 38. The other electrode of the capacitor 36 is connected with a line that connects the second charging main relay 22 and the charger 38. In other words, the capacitor 36 is connected in parallel with the charger 38. The capacitor 36 smoothes voltage at an end on the battery 10 side, which functions as an output end, of the charger 38.

One end of the pre-charge relay 24 is coupled to an end, on the pre-charge relay 18 side, of the resistor 34, more precisely, a node connecting the resistor 34 and the pre-charge relay 18 to each other. The other end of the pre-charge relay 24 is coupled to an end, on the charger 38 side, of the second charging main relay 22. That is, the resistor 34 and the pre-charge relay 24 are serially connected and form a serial unit 76. The serial unit 76 is connected in parallel to the second charging main relay 22.

The resistor 34 is used to charge or pre-charge the capacitor 28 and to charge or pre-charge the capacitor 36. The resistor 34 has a predetermined resistance value for limiting an inrush current in pre-charging the capacitor 28 or 36. The resistance value of the resistor 34 is set in consideration of the voltage of the battery 10, the pre-charge times of the capacitors 28 and 36, and other factors.

The first system main relay 14, the second system main relay 16, the pre-charge relay 18, the first charging main relay 20, the second charging main relay 22, the pre-charge relay 24, the first temperature measuring unit 30, the second temperature measuring unit 32, and the resistor 34 are housed in a junction box 78. The junction box 78 is formed of a highly durable container. This maintains the system main relays and other components housed in the junction box 78 in a safe state even when collision accident occurs in the vehicle 2.

The charger 38 receives electric power from the outside of the vehicle 2 and supplies the received electric power to the battery 10 via the first charging main relay 20 and the second charging main relay 22. For example, the charger 38 is coupled to a charging plug of a charging station and is supplied with electric power via the charging plug. The charger 38 may be supplied with electric power in a contactless manner from a feeder apparatus installed on a road surface during stop or travelling of the vehicle 2.

The charger 38 sends a charge request signal for requesting charging from the outside, to the controller 42. The charger 38 sends the charge request signal, which is an OFF signal, to the controller 42, for example, when the charger 38 is not coupled to a charge plug or when the vehicle 2 does not exist in an area where the vehicle 2 is able to receive electric power in a contactless manner. On the other hand, the charger 38 sends the charge request signal, which is an ON signal, for example, when the charger 38 is coupled to a charge plug or when the vehicle 2 enters an area where the vehicle 2 is able to receive electric power in the contactless manner.

The start switch 40 receives ignition-on (IG-ON) operation and ignition-off (IG-OFF) operation performed by a passenger of the vehicle 2. In response to the IG-ON operation, the start switch 40 sends an IG-ON signal indicating the ignition-on state, to the controller 42. In response to the IG-OFF operation, the start switch 40 sends an IG-OFF signal indicating the ignition-off state, to the controller 42.

The controller 42 includes a semiconductor integrated circuit including elements such as a central processing unit (CPU), a ROM storing programs and the like, and a RAM serving as a work area. The controller 42 controls turning on and off or opening and closing of each relay based on signals such as the IG-ON signal, the IG-OFF signal, and the charge request signal. The relays include the first system main relay 14, the second system main relay 16, the pre-charge relay 18, the first charging main relay 20, the second charging main relay 22, and the pre-charge relay 24.

The surface of the contact point 64 of the system main relay may be roughened due to a cause such as arc discharging generated between the contact points 64 of the system main relay and aging deterioration of the system main relay.

For example, it is assumed that the system main relay is turned on, and current flows between the battery 10 and the onboard device 12 via the system main relay. In these conditions, when an abnormality occurs in an inverter implemented by the onboard device 12, the controller 42 makes the system main relay be turned off even if current flows in the system main relay. When the system main relay is turned off or instantaneously interrupted while being applied with current, arc discharging may occur between the contact points 64 of the system main relay.

The generated arc discharging may locally form an arc mark on the surface of the contact point 64. The arc mark is, for example, a fine dent in the order of micrometer. The arc mark is formed in the following manner. That is, the temperature of the surface of the contact point 64 locally increases due to the arc discharging. The material of the high temperature surface is slightly evaporated.

The evaporated material of the contact point 64 is, for example, fine particles in the order of micrometer. The evaporated material of the contact point 64 diffuses between the contact points 64. This material then spreads over and adheres to the surface of the contact point 64 for example, the surface of the contact point 64 on a side opposite to the contact point 64 that is formed with the ark mark. As a result, the surface of the contact point 64 locally protrudes by the amount of the adhered material. In other words, the adhered material makes the contact surface of the contact point 64 protrude locally. The generated arc discharging can thus roughen the surface of the contact point 64.

In another example, continuous use of the system main relay causes thermal fatigue due to current flowing in the system main relay, thereby locally distorting the surface of the contact point 64 in some cases. The aging deterioration of the system main relay can thus roughen the surface of the contact point 64.

When the surface of the contact point 64 is roughened, the resistance value due to contact resistance between the contact points 64 may be increased. For example, the contact points 64 are brought into contact with each other via the adhered material that makes the contact surface protrude, thereby increasing the resistance value of the contact point 64.

When the resistance value of the contact point 64 is increased, current that flows between the contact points 64 generates heat at the contact point 64, thereby increasing the temperature of the contact point 64. As described above, the battery 10 has a high voltage, so that current flowing in the system main relay is relatively large. Thus, the temperature tends to be increased in the system main relay, in particular, at the contact point 64.

There is room for improvement in that the contact point 64 having an excessively high temperature may cause welding between the contact points 64. The welding between the contact points 64 prevents the battery 10 and the onboard device 12 from being electrically disconnected from each other. In addition, the welding between the contact points 64 may lead to a replacement or repair of the corresponding system main relay.

In view of this, the controller 42 of the switch system 1 makes the system main relay repeatedly turn on and off the contact point 64 at a predetermined timing when an amount of rise in the temperature of the contact point 64 of the system main relay within a predetermined time period is a predetermined amount or more. That is, the controller 42 performs this process when the resistance value of the contact point 64 of the system main relay is a predetermined resistance value or more.

For example, the controller 42 acquires temperature that is measured by the first temperature measuring unit 30 and temperature that is measured by the second temperature measuring unit 32. When either one or both of (i) an amount of rise in the temperature measured by the first temperature measuring unit 30 within the predetermined time period and (ii) an amount of rise in the temperature measured by the second temperature measuring unit 32 within the predetermined are the predetermined amount or more, the controller 42 determines that the amount of rise in the temperature of the contact point 64 of the system main relay within the predetermined time period is the predetermined amount or more. The predetermined amount is, for example, set at 30° C. It is assumed that current of 100 A flowing through the contact point 64 for 10 seconds increases the temperature measured by the first temperature measuring unit 30 from 60° C. to 90° C. In this case, the controller 42 determines that the amount of rise in the temperature of the contact point 64 is the predetermined amount or more. It is noted that the predetermined amount is not limited to this example.

In another example, when the input and output currents of the battery 10 are not stable, the temperature of the contact point 64 of the system main relay may not be accurately measured. In consideration of this, the controller 42 makes a determination about the temperature of the contact point 64 of the system main relay based on the temperature of the contact point 64 of the system main relay when the input and output currents of the battery 10 are stable.

For example, the controller 42 continuously acquires a current value that is measured by the current measuring unit 26, for a predetermined time period. The controller 42 determines whether the current value, which is measured by the current measuring unit 26, is stable for the predetermined time period. The predetermined time period is, for example, set at 10 seconds, but this is not limited thereto. The controller 42 calculates an average value of the acquired current values within the predetermined time period and then calculates a deviation of the current value from the average value, with respect to the current value at each time. When the deviation of the current value is within a predetermined deviation for the predetermined time period, the controller 42 determines that the input and output currents of the battery 10 are stable. On the other hand, when the deviation of the current value exceeds the predetermined deviation at least once during the predetermined time period, the controller 42 determines that the input and output currents of the battery 10 are not stable.

When determining that the input and output currents of the battery 10 are not stable, the controller 42 does not make the determination about the temperature of the contact point 64 of the system main relay.

The controller 42 makes such a determination about the temperature of the contact point 64 while current is flowing in the system main relay. For example, the controller 42 makes the determination about the temperature of the contact point 64 while the vehicle 2 is in the IG-ON state, that is, is ready to travel and the battery 10 is being charged via the charger 38. Upon determining that the amount of rise in the temperature of the contact point 64 within the predetermined time period is the predetermined amount or more, the controller 42 makes the system main relay repeatedly turn on and off the contact point 64 at a predetermined timing.

When the controller 42 makes the determination about the temperature of the contact point 64 while the vehicle 2 is in the IG-ON state, the predetermined timing is at the time of turning off the vehicle 2. When the controller 42 makes the determination about the temperature of the contact point 64 during charging, the predetermined timing is at the completion of charging. The predetermined timing is limited to neither the time of turning off nor the time of completion of charging, but may be time that is designated by a user, for example.

The controller 42 determines the number of repetition of turning on and off the contact point 64 of the system main relay based on the amount of rise in the temperature measured by the temperature measuring unit within the predetermined time period. The number of repetition of turning on and off the contact point 64 of the system main relay may be referred to as a "number of turning on and off", hereinafter. One cycle is composed of one turning-on and one turning-off and is counted as one turning on and off.

The controller 42 determines the number of turning on and off based on, for example, the higher one of the amounts of rise in the temperatures measured by the first temperature measuring unit 30 and the second temperature measuring unit 32 within the predetermined time period. The controller 42 determines the number of turning on and off by referring to a table in which the amount of rise in the temperature within the predetermined time period is associated with the number of turning on and off. Alternatively or additionally, the controller 42 may directly calculate the number of turning on and off using a relational expression in which the amount of rise in the temperature within the predetermined time period is associated with the number of turning on and off.

The amount of rise in temperature within the predetermined time period and the number of turning on and off are associated with each other such that, for example, the number of turning on and off increases with increase in the amount of rise in the temperature within the predetermined time period. Alternatively, the number of turning on and off may be increased proportionally to temperature or may be increased quadratically.

The repetition frequency of the turning on and off the contact point 64 is, for example, set at 2 to 3 Hz, but this is not limited thereto. The number of turning on and off is determined, for example, in a range of 10 times to 1000 times, based on temperature, but this is not limited thereto.

Instead of determining the number of turning on and off based on the temperature of the contact point 64 of the system main relay, the number of turning on and off may be set in advance, for example.

The controller 42 makes each of the first system main relay 14 and the second system main relay 16 repeatedly turn on and off the contact point 64 by the temperature-based number of turning on and off or the preset number of turning on and off.

The controller 42 may make the first system main relay 14 turn on and off the contact point 64 by the number of turning on and off, which is based on the temperature measured by the first temperature measuring unit 30. The controller 42 may also make the second system main relay 16 turn on and off the contact point 64 by the number of turning on and off, which is based on the temperature measured by the second temperature measuring unit 32.

Repeatedly turning on and off the contact point 64 of the system main relay decreases the increased resistance value of the contact point 64. For example, it is assumed that the resistance value has increased due to a material adhered on the surface of the contact point 64 by arc discharging. In this condition, when the contact point 64 is repeatedly turned on and off, the contact points 64 hit each other. For example, the first stationary contact point 52 and the movable contact point 56 hit each other, and the second stationary contact point 54 and the movable contact point 56 hit each other. This makes the material adhered on the surface of the contact point 64 flat between the contact points 64. As the adhered material is flattened, the contact area between the adhered material and the surface of the contact point 64 is increased. That is, the surface of the contact point 64 is smoothed by repeatedly turning on and off the contact point 64.

Also, even when the surface of the contact point 64 is locally distorted, the surface of the contact point 64 is smoothed by repeatedly turning on and off the contact point 64.

When the surface of the contact point 64 is smoothed, the resistance value of the contact point 64 is decreased. The decrease in the resistance value of the contact point 64 represents recovery of the resistance value that has been increased. Repeatedly turning on and off the contact point 64 of the system main relay may also be simply referred to as "turning on and off the system main relay", hereinafter.

In turning on and off the system main relay, the controller 42 makes the first system main relay 14 repeatedly turn on and off the contact point 64 while the second system main relay 16 is turned off. After the turning on and off of the first system main relay 14 is finished, the controller 42 makes the second system main relay 16 repeatedly turn on and off the contact point 64 while the first system main relay 14 is turned off.

The controller 42 may make the second system main relay 16 be turned on and off prior to turning on and off the first system main relay 14. That is, the controller 42 makes the repetition timing of turning on and off the contact point 64 of the first system main relay 14 differ from the repetition timing of turning on and off the contact point 64 of the second system main relay 16.

The timing of turning on and off the first system main relay 14 is differentiated from the timing of turning on and off the second system main relay 16. This enables turning on and off the first system main relay 14 and the second system main relay 16 without energizing the battery 10 and the onboard device 12, or more precisely, the capacitor 28. As a result, generation of arc discharging is suppressed during turning on and off the system main relay.

Figure 3:
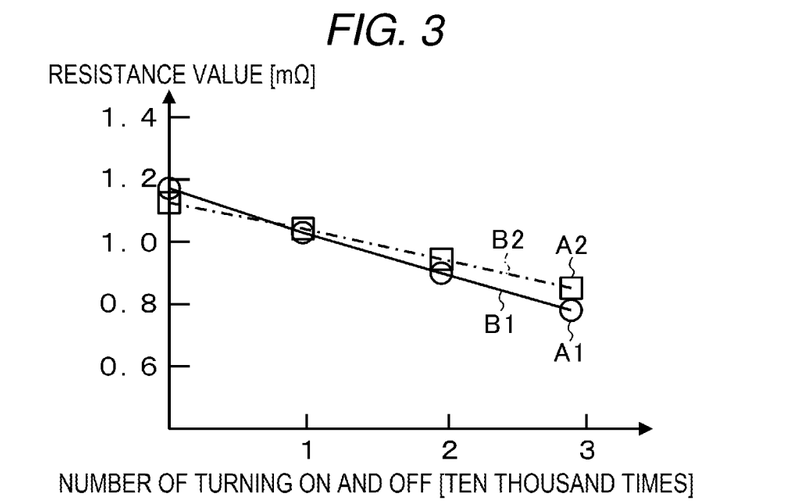
FIG. 3 is a graph illustrating a relationship between the number of turning on and off and a resistance value of a contact point.

FIG. 3 is a graph illustrating a relationship between the number of turning on and off and the resistance value of the contact point 64. In FIG. 3, circle marks A1 represent an experimental result of a first sample, and square marks A2 represent an experimental result of a second sample. A solid line B1 is obtained by approximation using a least-squares method or other method, relative to data represented by the circle marks A1. A chain line B2 is obtained by approximation using a least-squares method or other method, relative to data represented by the square marks A2.

As illustrated by the solid line B1 and the chain line B2 in FIG. 3, turning on and off the system main relay decreases the resistance value of the contact point 64. FIG. 3 illustrates the result of repeatedly turning on and off close to thirty thousand times. In actual cases, it is possible to decrease the resistance value of the contact point 64 by repeatedly turning on and off at least a few times.

Figure 4:
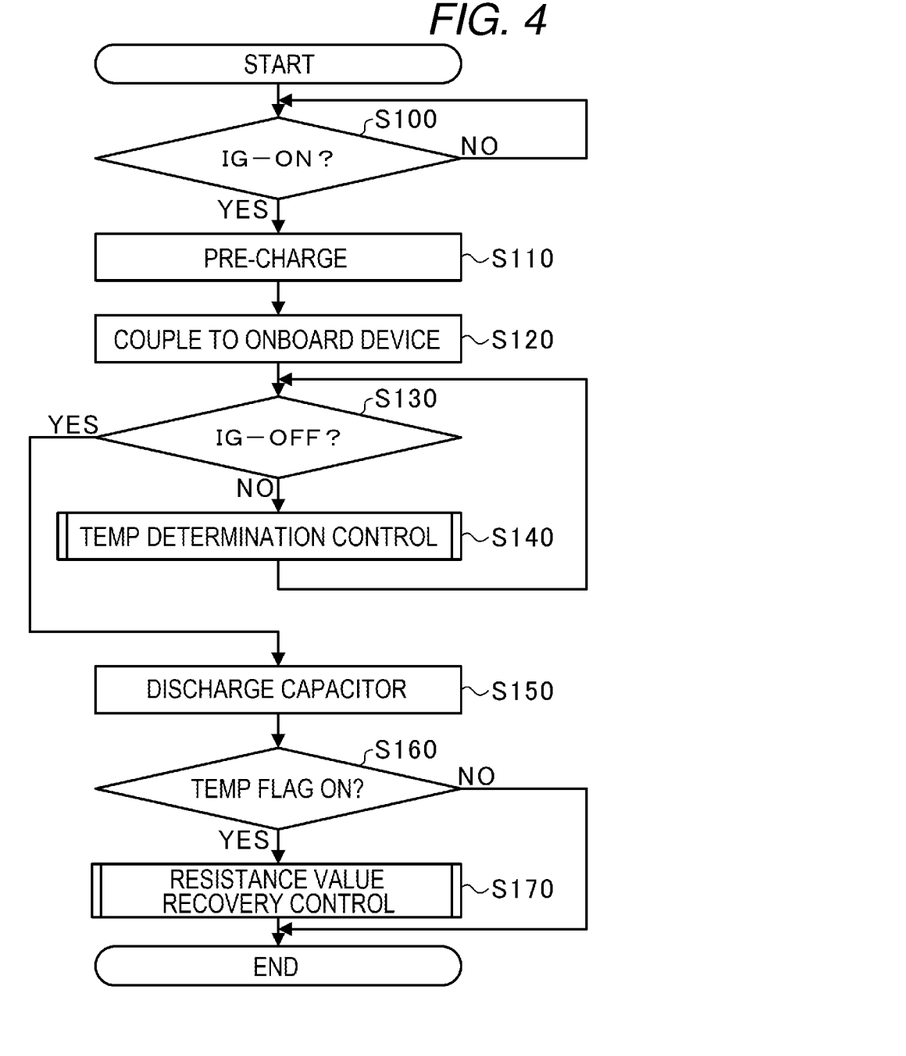
FIG. 4 is a flowchart illustrating operation of a controller during travelling.

FIG. 4 is a flowchart illustrating operation of the controller 42 during travelling. The first system main relay 14, the second system main relay 16, the pre-charge relay 18, the first charging main relay 20, the second charging main relay 22, and the pre-charge relay 24 are turned off in the initial state.

The controller 42 determines whether the controller 42 receives an IG-ON signal from the start switch 40 (S100). When not receiving the IG-ON signal (NO in S100), the controller 42 waits until receiving the IG-ON signal.

When receiving the IG-ON signal (YES in S100), the controller 42 turns on the first system main relay 14 and the pre-charge relay 18 to pre-charge the capacitor 28 while the second system main relay 16 is turned off (S110).

When the pre-charge of the capacitor 28 is completed, the voltage of the capacitor 28 reaches approximately the same as the voltage of the battery 10. After the pre-charge of the capacitor 28 is completed, the controller 42 turns on the second system main relay 16 and turns off the pre-charge relay 18 to electrically connect the onboard device 12 and the battery 10 to each other (S120). Thus, the vehicle 2 is made ready to travel.

Next, the controller 42 determines whether the controller 42 receives the IG-OFF signal from the start switch 40 (S130).

When not receiving the IG-OFF signal (NO in S130), the controller 42 performs temperature determination control for making a determination about temperature of the contact point 64 of the system main relay (S140). The flow of the temperature determination control (S140) will be described later. After performing the temperature determination control, the controller 42 returns to the process in step S130 and determines whether the controller 42 receives the IG-OFF signal.

When receiving the IG-OFF signal (YES in S130), the controller 42 turns off the first system main relay 14 and the second system main relay 16 to discharge the capacitor 28 (S150).

Next, the controller 42 determines whether a temperature flag is turned on (S160). The temperature flag indicates whether the amount of rise in the temperature of the contact point 64 of the system main relay within the predetermined time period is the predetermined amount or more. The temperature flag is turned on when the controller 42 determines that the amount of rise in the temperature within the predetermined time period is the predetermined amount or more in the temperature determination control. The temperature flag is maintained to be in the on state until being turned off.

When the temperature flag is not turned on (NO in S160), the controller 42 finishes the series of the processes in FIG. 4. On the other hand, when the temperature flag is turned on (YES in S160), the controller 42 starts resistance value recovery control that includes turning on and off the system main relay (S170). Thereafter, the controller 42 finishes the series of the processes in FIG. 4. The flow of the resistance value recovery control will be described later.

Figure 5:
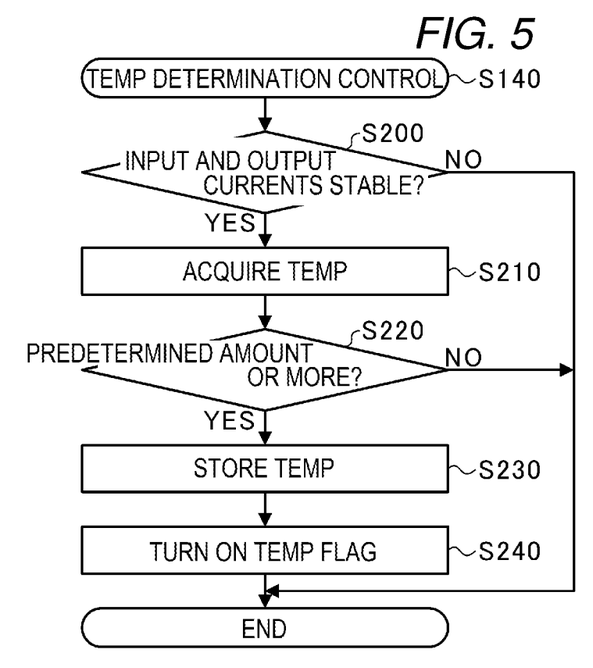
FIG. 5 is a flowchart illustrating temperature determination control.

FIG. 5 is a flowchart illustrating the temperature determination control (S140). The controller 42 determines whether the input and output currents of the battery 10 are stable (S200). In some cases, the input and output currents of the battery 10 are unstable because the load on the motor tends to vary during traveling of the vehicle 2. On the other hand, during high-speed traveling or other situations, for example, the input and output currents of the battery 10 are stable because variations in the load on the motor are small.

When the input and output currents of the battery 10 are not stable (NO in S200), the controller 42 finishes the series of the processes in FIG. 5. That is, the controller 42 returns to the process in step S130 in FIG. 4.

When the input and output currents of the battery 10 are stable (YES in S200), the controller 42 acquires temperature of the contact point 64 of the system main relay (S210). For example, the controller 42 acquires temperatures from the first temperature measuring unit 30 and temperature from the second temperature measuring unit 32.

Thereafter, the controller 42 determines whether the amount of rise in the temperature of the contact point 64 of the system main relay within the predetermined time period is the predetermined amount or more (S220). For example, the controller 42 determines whether the amount of rise in the temperature of the contact point 64 is the predetermined amount or more when current flows for a predetermined time period after the input and output currents of the battery 10 become stable. This predetermined time period is, for example, 10 seconds. The controller 42 may acquire a reference temperature before the temperature rises, prior to determination about the input and output currents.

When the amount of rise in the temperature of the contact point 64 of the system main relay within the predetermined time period is less than the predetermined amount (NO in S220), the controller 42 finishes the series of the processes in FIG. 5.

When the amount of rise in the temperature of the contact point 64 of the system main relay within the predetermined time period is the predetermined amount or more (YES in S220), the controller 42 stores the temperature of the contact point 64 of the system main relay, which has risen by the predetermined amount or more, in a register or another device (S230). The temperatures of the contact points 64 of the system main relay are acquired from the first temperature measuring unit 30 and the second temperature measuring unit 32.

Next, the controller 42 turns on the temperature flag (S240) and finishes the series of the processes in FIG. 5. In the condition in which the temperature flag is turned on, the controller 42 performs the resistance value recovery control when the vehicle 2 is in the IG-OFF state.

Figure 6:
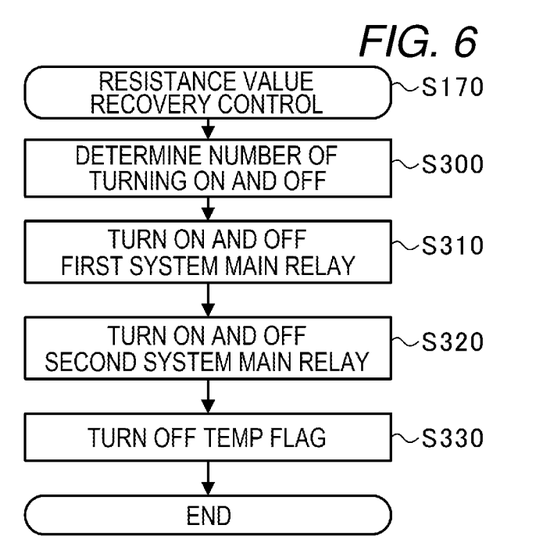
FIG. 6 is a flowchart illustrating resistance value recovery control.

FIG. 6 is a flowchart illustrating the resistance value recovery control (S170). The controller 42 determines the number of turning on and off the system main relay based on the temperature measured by the temperature measuring unit (S300). For example, the controller 42 determines the number of turning on and off, using the temperature stored in step S230 in FIG. 5. When multiple temperatures are stored, the controller 42 determines the number of turning on and off using a maximum temperature among the stored temperatures.

Next, the controller 42 makes the first system main relay 14 repeatedly turn on and off the contact point 64 by the number of turning on and off determined in step S300 while the second system main relay 16 is turned off (S310). When the number of turning on and off reaches the number of turning on and off determined in step S300, the turning on and off operation of the first system main relay 14 is completed.

After the turning on and off of the first system main relay 14 is completed (S310), the controller 42 makes the second system main relay 16 repeatedly turn on and off the contact point 64 by the number of turning on and off determined in step S300 while the first system main relay 14 is turned off (S320). When the number of turning on and off reaches the number of turning on and off determined in step S300, the turning on and off operation of the second system main relay 16 is completed.

After the turning on and off of the second system main relay 16 is completed (S320), the controller 42 turns off the temperature flag (S330) and finishes the series of the processes in FIG. 6.

In response to the resistance value recovery control in FIG. 6, the resistance value of the contact point 64 is decreased, and the temperature of the contact point 64 of the system main relay is consequently decreased to be lower than the temperature before the resistance value recovery control is performed. This avoids welding between the contact points 64 of the system main relay in the switch system 1. Thus, replacement and repair of the system main relay of the switch system 1 is avoided.

In some cases, the resistance value of the contact point 64 may not be sufficiently decreased even though the system main relay is turned on and off. In such cases, when the ignition is turned on for the next driving cycle after the system main relay is turned on and off, the amount of rise in the temperature of the contact point 64 of the system main relay within the predetermined time period may be the predetermined amount or more. Under these conditions, the controller 42 performs the resistance value recovery control again at the next time of the IG-OFF state. The switch system 1 thus turns on and off the system main relay over multiple driving cycles, thereby more reliably decreasing the resistance value of the contact point 64.

The controller 42 may perform the resistance value recovery control after the charging is completed by the charger 38, as well as at the time of the IG-OFF state. The following describes the operation during charging.

Figure 7:
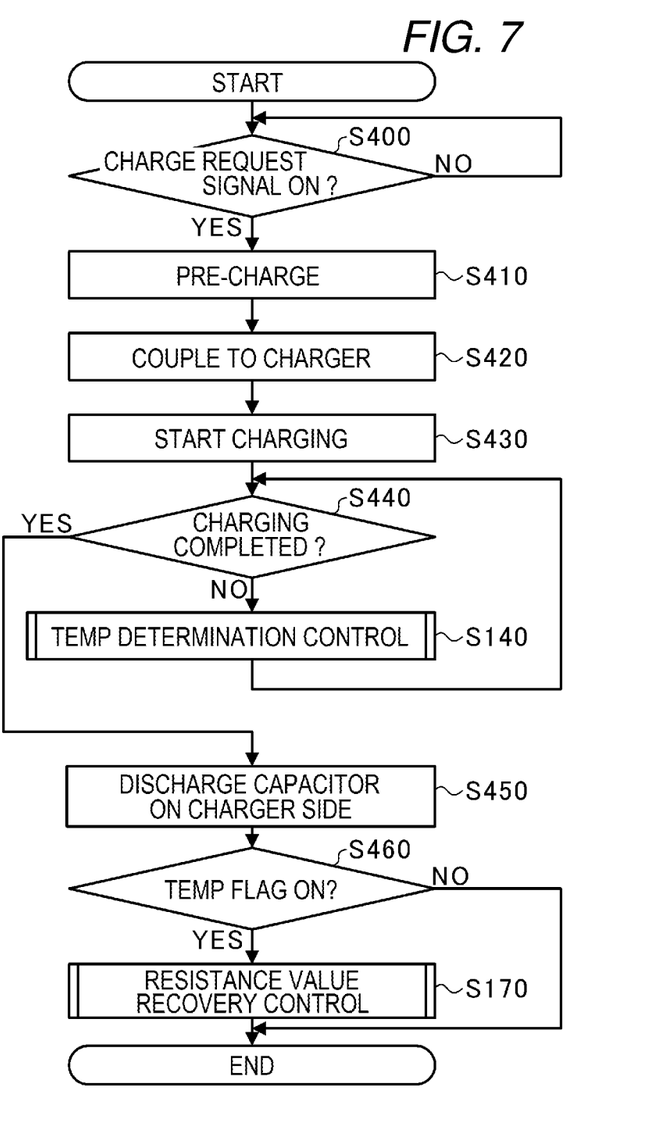
FIG. 7 is a flowchart illustrating operation of the controller during charging.

FIG. 7 is a flowchart illustrating operation of the controller 42 during charging. The controller 42 determines whether the charge request signal is turned on (S400). When the charge request signal is not turned on (NO in S400), the controller 42 waits until the charge request signal is turned on.

When the charge request signal is turned on (YES in S400), the controller 42 performs the processes in step S410 and subsequent steps. First, the controller 42 turns on the first charging main relay 20 and the pre-charge relay 24 to pre-charge the capacitor 36 while the second charging main relay 22 is turned off (S410).

When the pre-charge of the capacitor 36 is completed, the voltage of the capacitor 36 reaches approximately the same as the voltage of the battery 10. After the pre-charge of the capacitor 36 is completed, the controller 42 turns on the second charging main relay 22 and turns off the pre-charge relay 24 to electrically connect the charger 38 and the battery 10 to each other (S420). Thus, the vehicle 2 is made ready for charging.

The controller 42 makes the charger 38 start charging the battery 10 (S430). Next, the controller 42 determines whether the charging is completed (S440). For example, the controller 42 determines that the charging is completed when a state of charge (SOC) of the battery 10 is a predetermined SOC or more. The predetermined SOC is, for example, set at 95%, but this is not limited thereto.

When the charging is not completed (NO in S440), the controller 42 performs the temperature determination control (S140). The temperature determination control is performed through processes similar to those in the series of the processes illustrated in FIG. 5.

After performing the temperature determination control, the controller 42 returns to the process in step S440 and determines whether the charging is completed. That is, the controller 42 returns to the process in step S440 when the input and output currents are not stable (NO in S200), when the amount of rise in the temperature within the predetermined time period is less than the predetermined amount (NO in S220), and when the temperature flag is turned on (S240) in the temperature determination control.

In charging via the charger 38, electric power having an approximately constant current value is supplied to the battery 10. Thus, the input and output currents of the battery 10 during charging are easily stabilized compared with a case of traveling. The temperature determination control is easily performed in charging, compared with the case of traveling.

When the charging is completed (YES in S440), the controller 42 turns off the first charging main relay 20 and the second charging main relay 22 to discharge the capacitor 36 on the charger 38 side (S450).

Next, the controller 42 determines whether the temperature flag is turned on (S460). When the temperature flag is not turned on (NO in S460), the controller 42 finishes the series of the processes in FIG. 7.

When the temperature flag is turned on (YES in S460), the controller 42 starts the resistance value recovery control (S170). Thereafter, the controller 42 finishes the series of the processes in FIG. 7. The resistance value recovery control is performed through processes similar to those in the series of the processes illustrated in FIG. 6.

As described above, when the amount of rise in the temperature of the contact point 64 of the system main relay within the predetermined time period is the predetermined amount or more, the switch system 1 of the first embodiment makes the system main relay repeatedly turn on and off the contact point 64 at the predetermined timing. This smoothes the surface of the contact point 64 of the system main relay in the switch system 1 of the first embodiment.

Thus, the switch system 1 of the first embodiment enables decreasing the increased resistance value of the contact point 64.

The controller 42 of the switch system 1 of the first embodiment determines the number of repetition of turning on and off the contact point 64 based on the temperature measured by the temperature measuring unit. As the temperature of the contact point 64 is higher, the resistance value of the contact point 64 is higher, and the surface of the contact point 64 is more roughened. The controller 42 increases the number of turning on and off as the temperature of the contact point 64 is higher, that is, the surface of the contact point 64 is more roughened, to smooth the surface of the contact point 64. Thus, the switch system 1 of the first embodiment more reliably decreases the resistance value.

The controller 42 of the switch system 1 of the first embodiment turns on and off the system main relay at the time of the IG-OFF state of the vehicle 2 or at the completion of charging of the battery 10. That is, the controller 42 makes the system main relay repeatedly turn on and off the contact point 64 while no current flows in the system main relay. Thus, the switch system 1 of the first embodiment suppresses generation of arc discharging at the contact point 64 during turning on and off the system main relay.

Second Embodiment

In the first embodiment, turning on and off the first system main relay 14 and turning on and off the second system main relay 16 are alternately performed. However, turning on and off the second system main relay 16 may be performed while the first system main relay 14 and the pre-charge relay 18 are turned on.

Figure 8:
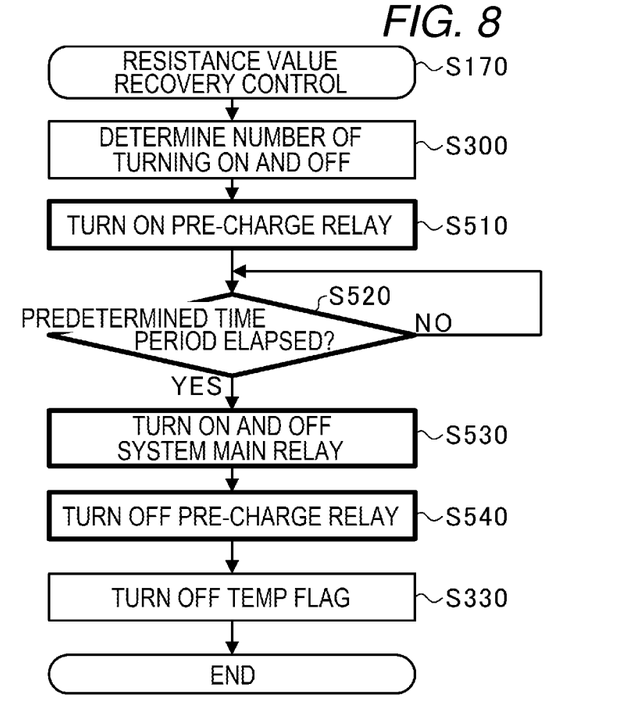
FIG. 8 is a flowchart illustrating the resistance value recovery control according to a second embodiment.

FIG. 8 is a flowchart illustrating resistance value recovery control according to the second embodiment. The flowchart in FIG. 8 differs from the flowchart in FIG. 6 in having steps S510 to S540 instead of steps S310 and S320. These different steps will be described in detail, and descriptions of similar steps will be omitted.

After determining the number of turning on and off (S300), the controller 42 turns on the first system main relay 14 and the pre-charge relay 18 while the second system main relay 16 is turned off (S510). That is, the controller 42 makes current flow through the battery 10 and the capacitor 28 via the resistor 34. As a result, the capacitor 28 is pre-charged via the resistor 34.

Next, the controller 42 determines whether a predetermined time period elapses (S520). When the predetermined time period does not elapse (NO in S520), the controller 42 waits until the predetermined time period elapses. The controller 42 thus waits until the predetermined time period elapses in order to decrease the potential difference between the potential on the battery 10 side and the potential on the onboard device 12 side of the second system main relay 16, by pre-charging the capacitor 28.

When the predetermined time period elapses (YES in S520), the controller 42 makes the second system main relay 16 turn on and off the contact point 64 by the number of turning on and off determined in step S300 (S530). During repeatedly turning on and off the second system main relay 16, the controller 42 maintains the first system main relay 14 and the pre-charge relay 18 in the on state. That is, the controller 42 makes the second system main relay 16 continue to be turned on and off in the state in which the potential difference between both sides of the second system main relay 16 is as low as possible. This suppresses inrush current to the capacitor 28 even though the battery 10 and the onboard device 12 are coupled to each other by turning on the second system main relay 16.

After the turning on and off operation of the second system main relay 16 is completed, the system main relay is maintained in the off state. Next, the controller 42 turns off the pre-charge relay 18 (S540). Thereafter, the controller 42 turns off the temperature flag (S330) and finishes the series of the processes in FIG. 8.

In the second embodiment, the controller 42 may perform the processes in steps S150 and subsequent steps without performing the process in S130 after performing the temperature determination control (S140) in FIG. 4. That is, the second system main relay 16 may be turned on and off in the IG-ON state. In this case, after the turning on and off operation of the second system main relay 16 is completed, the second system main relay 16 is maintained in the on state.

In the second embodiment, the controller 42 may perform the processes in steps S160 and subsequent steps without performing the process in S150 in FIG. 4. That is, the pre-charge relay 18 may be turned on without once discharging the capacitor 28, in order to omit the time used for discharging.

As described above, the contact point 64 of the second system main relay 16 is repeatedly turned on and off in the second embodiment. This decreases the increased resistance value of the contact point 64.

As described in the second embodiment, it is possible to perform the resistance value recovery control, that is, the turning on and off of the system main relay, even when the system main relay is supplied with current. The system main relay is turned on and turn off while generation of arc discharging at the contact point 64 is suppressed by making the potential difference between both sides of the system main relay as low as possible, even when the system main relay is supplied with current.

The embodiments of the disclosure have been described with reference to the accompanying drawings. It is noted that the disclosure are not limited to such embodiments. It will be apparent to those skilled in the art that various changes and modifications to the embodiments can be conceived within the scope of the appended claims, and it is to be understood that such changes and modifications also belong to the technical scope of the disclosure.

For example, the controller 42 of each of the foregoing embodiments turns on and off the system main relay when the amount of rise in the temperature of the contact point 64 is the predetermined amount or more. However, the controller 42 may make the system main relay repeatedly turn on and off the contact point 64 at a predetermined timing when the temperature of the contact point 64 is a predetermined temperature or more. For example, the controller 42 makes the system main relay repeatedly turn on and off the contact point 64 at a predetermined timing when either one or both of the temperature measured by the first temperature measuring unit 30 and the temperature measured by the second temperature measuring unit 32 are, for example, 100° C. or more.

The controller 42 may make the contact points 64 hit each other during turning on and off the system main relay, with a strength higher than the strength with which the contact points 64 hit each other during a normal state, such as the IG-ON state. For example, the controller 42 may make the voltage that is applied to the electromagnetic coil 58 of the system main relay during turning on and off, higher than the voltage applied to the electromagnetic coil 58 of the system main relay during the normal state. For example, the voltage of an auxiliary battery, which is lower than the voltage of the battery 10, may be applied as it is to the electromagnetic coil 58 during the normal state, and the voltage of the auxiliary battery may be increased and be applied to the electromagnetic coil 58 during turning on and off.

When the contact points 64 hit each other with a high strength, for example, the material adhered on the surface of the contact point 64 is easily flattened, and the surface of the contact point 64 is rapidly smoothed. This manner makes it possible to decrease the number of turning on and off the system main relay, thereby more rapidly decreasing the resistance value.

The controller 42 may make the contact points 64 hit each other during turning on and off the system main relay, at a speed higher than the speed at which the contact points 64 hit each other during the normal state. For example, the controller 42 may make a rise of a waveform of the voltage applied to the electromagnetic coil 58 during turning on and off, steeper than the rise of the waveform of the voltage applied to the electromagnetic coil 58 during the normal state.

When the contact points 64 hit each other at a high speed, for example, the material adhered on the surface of the contact point 64 is easily flattened, and the surface of the contact point 64 is rapidly smoothed. This manner makes it possible to decrease the number of turning on and off the system main relay, thereby more rapidly decreasing the resistance value.

The controller 42 may make the speed for turning on higher than the speed for turning off during turning on and off. For example, the controller 42 may make the rise of the waveform of the voltage applied to the electromagnetic coil 58 steeper than the fall thereof during turning on and off. The turning off operation by which the contact points 64 are separated from each other does not contribute to flattening of the material adhered on the surface of the contact point 64. That is, the switch system 1 decreases the resistance value of the contact point 64 even when the speed of the turning off operation is slow. Thus, in this example, the resistance value of the contact point 64 of the system main relay is efficiently decreased.

According to at least one embodiment, it is therefore possible to decrease the increased resistance value of the contact point.

The invention claimed is:

1. A switch system, comprising:
   a system main relay configured to:
      electrically connect a battery and an onboard device to each other by turning on a contact point; and
      electrically disconnect the battery and the onboard device by turning off the contact point;
   a temperature measuring unit configured to measure a temperature of the contact point of the system main relay;
   a controller configured to cause the system main relay to repeatedly turn on and off the contact point at a predetermined timing, (i) when the temperature of the contact point of the system main relay is a predetermined temperature or more, or (ii) when an amount of rise in the temperature of the contact point is a predetermined amount or more; and
   a charging main relay that supplies an electric power to the battery, a contact point of the charging main relay being coupled to a connecting line of the battery to the system main relay, and another contact point of the charging main relay being coupled to a charger that transmits the electric power to the charging main relay,
   wherein the system main relay, comprises:
      a first system main relay coupleable to a first electrode of the battery; and
      a second system main relay coupleable to a second electrode of the battery, and
   wherein the controller is further configured to repeatedly turn on and off the contact point of one of the first system main relay and the second system main relay while another one of the first system main relay and the second system main relay is maintained in an off state.

2. The switch system according to claim 1, wherein the controller is further configured to determine a number of a repetition of turning on and off the contact point based on the temperature measured by the temperature measuring unit.

3. The switch system according to claim 2, further comprising:
   a resistor; and
   a pre-charge relay serially coupled to the resistor,
   wherein the resistor and the pre-charge relay are coupled in parallel to the system main relay, and
   wherein the controller is configured to turn on the pre-charge relay before repeatedly turning on and off the contact point at the predetermined timing.

4. The switch system according to claim 3, wherein the controller is further configured to maintain the pre-charge relay in an on state during the repeatedly turning on and off the contact point.

5. The switch system according to claim 4, wherein the predetermined timing is either one of (i) a timing at which an ignition of a vehicle to be provided with the system switch is turned off or (ii) a timing at which charging of the battery is completed.

6. The switch system according to claim 3, wherein the predetermined timing is either one of (i) a timing at which an ignition of a vehicle to be provided with the system switch is turned off or (ii) a timing at which charging of the battery is completed.

7. The switch system according to claim 2, wherein the predetermined timing is either one of (i) a timing at which an ignition of a vehicle to be provided with the system switch is turned off or (ii) a timing at which charging of the battery is completed.

8. The switch system according to claim 1, further comprising:
   a resistor; and
   a pre-charge relay serially coupled to the resistor,
   wherein the resistor and the pre-charge relay are coupled in parallel to the system main relay, and
   wherein the controller is configured to turn on the pre-charge relay before repeatedly turning on and off the contact point at the predetermined timing.

9. The switch system according to claim 8, wherein the predetermined timing is either one of (i) a timing at which an ignition of a vehicle to be provided with the system switch is turned off or (ii) a timing at which charging of the battery is completed.

10. The switch system according to claim 1, wherein the predetermined timing is either one of (i) a timing at which an ignition of a vehicle to be provided with the system switch is turned off or (ii) a timing at which charging of the battery is completed.

11. The switch system according to claim 10, wherein the predetermined timing is either one of (i) a timing at which an ignition of a vehicle to be provided with the system switch is turned off or (ii) a timing at which charging of the battery is completed.

12. The switch system according to claim 1, wherein the other contact point of the charging main relay is directly connected to the charger and to a. capacitor that adjusts a voltage at a side of the battery.

13. A switch system, comprising:
   a system main relay configured to:
      electrically connect a battery and an onboard device to each other by turning on a contact point; and
      electrically disconnect the battery and the onboard device by turning off the contact point;
   a temperature measuring unit configured to measure a temperature of the contact point of the system main relay;
   a controller configured to cause the system main relay to repeatedly turn on and off the contact point at a predetermined timing, (i) when the temperature of the contact point of the system main relay is a predetermined temperature or more, or (ii) when an amount of rise in the temperature of the contact point is a predetermined amount or more:

a charging main relay that supplies an electric power to the battery, a contact point of the charging main relay being coupled to a connecting line of the battery to the system main relay, and another contact point of the charging main relay being coupled to a charger that transmits the electric power to the charging main relay;

a resistor; and a pre-charge relay serially coupled to the resistor, wherein the resistor and the pre-charge relay are coupled in parallel to the system main relay, wherein the controller is further configured to turn on the pre-charge relay before repeatedly turning on and off the contact noint at the predetermined timing, and wherein the controller is further configured to maintain the pre-charge relay in an on state during the repeatedly turning on and off the contact point.

14. The switch system according to claim 13, wherein the predetermined timing is either one of (i) a timing at which an ignition of a vehicle to be provided with the system switch is turned off or (ii) a timing at which charging of the battery is completed.

* * * * *